United States Patent [19]
Marshall

[11] Patent Number: 5,598,429
[45] Date of Patent: Jan. 28, 1997

[54] MULTI-LEVEL CORRELATION SYSTEM FOR SYNCHRONIZATION DETECTION IN HIGH NOISE AND MULTI-PATH ENVIRONMENTS

[76] Inventor: Kenneth E. Marshall, 8179 San Leandro, Dallas, Tex. 75218

[21] Appl. No.: 276,033

[22] Filed: Jul. 15, 1994

[51] Int. Cl.$^6$ .................................................. H04L 27/30
[52] U.S. Cl. ............................ 375/210; 375/367; 370/515
[58] Field of Search .................................... 375/207–210, 375/286, 343, 367–368; 370/107; 364/819, 724.03, 728.07

[56] References Cited

U.S. PATENT DOCUMENTS

| | | | |
|---|---|---|---|
| 4,653,069 | 3/1987 | Roeder | 375/208 |
| 4,829,543 | 5/1989 | Borth et al. | 375/343 |
| 5,029,181 | 7/1991 | Endo et al. | 375/200 |
| 5,151,920 | 9/1992 | Haagh et al. | 375/200 |
| 5,199,050 | 3/1993 | Linsky | 375/367 |
| 5,206,887 | 4/1993 | Tsuda et al. | 375/365 |
| 5,237,587 | 8/1993 | Schoolcraft | 375/208 |
| 5,241,561 | 8/1993 | Barnard | 375/206 |
| 5,241,562 | 8/1993 | Partyka et al. | 375/206 |
| 5,416,797 | 5/1995 | Gilhonsen et al. | 375/205 |

OTHER PUBLICATIONS

"Why Spread Spectrum?", R. C. Dixon, *IEEE Communications*, vol. 13, Jul. 1975, pp. 21–25.
"Surface Acoustic Wave Devices", L. B. Milstein et al., *IEEE Communications*, vol. 17, No. 5, Sep. 1979, pp. 25–33.
"Spread Spectrum: Principles and Possible Application to Spectrum Utilization and Allocation", W. Utlaut, *IEEE Communications*, vol. 16, No. 5, Sep. 1978, pp. 21–31.
"Spread Spectrum Communications –Myths and Realities", A. Viterbi, *IEEE Communications*, vol. 17, No. 3, May 1979, pp. 11—18.
"The Application of Charge–Coupled Devices to Spread–Spectrum Systems", Donald M. Grieco, *IEEE Transactions on Communications*, vol. Com–28, No. 9, Sep. 1980, pp. 1693–1705.
"Spread Spectrum Receiver Using Surface Acoustic Wave Technology", L. B. Milstein, et al., *IEEE Transactions on Communications*, vol. COM–25, No. 8, Aug. 1977, pp. 841–847.

*Primary Examiner*—Young T. Tse
*Attorney, Agent, or Firm*—Ross, Clapp, Korn & Montgomery, L.L.P.

[57] ABSTRACT

A multi-level correlation technique and apparatus for detecting symbol and data frame synchronization in high noise and multi-path environments, wherein received signals are correlated with known pseudorandom noise (PN) or other known codes at the base level and the base level correlation results are in turn correlated with PN or other known codes at the next higher level, such that the top level of correlation includes all lower levels of encoding in the complete synchronization pattern. In a two level implementation, the base level codes define symbols while the top level code defines the synchronization pattern in terms of the base level symbols. Correlation hardware is minimized while processing gain is maximized for enhancing low signal to noise levels over a long synchronization pattern. Additionally, precise ranging is facilitated because the top level correlation result covers the entire synchronization pattern.

2 Claims, 9 Drawing Sheets

MULTI-LEVEL CORRELATION SYSTEM FOR SYNCHRONIZATION DETECTION IN HIGH NOISE AND MULTI-PATH ENVIRONMENTS

TECHNICAL FIELD OF THE INVENTION

The present invention relates to communication systems, and more particularly to a multi-level correlation system for detecting symbol and data frame synchronization.

BACKGROUND OF THE INVENTION

In a communication system, a preamble or synchronization pattern is used to define the start of a transmit packet. A transmit packet consists of a preamble/synchronization sequence followed by a data protocol sequence transmission. In shared access applications, the transmit carrier is switched on and off for the transmit packet. A number of techniques are currently employed to detect the synchronization pattern.

Many systems rely upon strong signal to noise ratios; some use increased transmit power during the synchronization period to accomplish the same effect. Received signal bit detection is performed and the resulting bit stream is compared to the expected synchronization pattern. When a specified percentage of the input bit stream compares with the expected synchronization pattern, synchronization is assumed.

An analogous effect occurs in a spread spectrum communication receiver which employs a surface acoustic wave (SAW) device. The down converted receive signal is impressed on the SAW device; the SAW device performs an analog comparison of the input signal with an expected bit (chip) sequence; and the SAW device output reflects the instantaneous comparison (or correlation) of the input signal and the expected chip sequence (or symbol). When the input signal is coherent with the expected chip sequence, the SAW device output peaks to indicate that the expected symbol has been received.

In a spread spectrum communication system, the preamble/synchronization pattern may be defined as a specified sequence of symbols. In a rate ½ coded system, two symbols are used to represent the two values for each data bit. When a specified percentage of the expected synchronization symbol sequence has been correctly received, synchronization is assumed.

In a poor signal to noise and/or multi-path environment, symbol detection and synchronization become more difficult. Increasing the length of the symbol chip sequence could improve symbol detection and therefore synchronization detection reliability; however, the SAW device (used for symbol detection) has definite limits. The SAW device is constrained by its maximum physical length, manufacturing tolerances, and thermal characteristics.

Employing high speed analog to digital conversion and a digital correlation system to replace the SAW device could enhance symbol detection by allowing much longer symbol chip sequences to be used; however, the resulting system would be considerably more expensive.

Increasing synchronization detect reliability by increasing the number of symbols in the synchronization pattern also has its limits, especially when symbol detection reliability is poor. A long preamble/synchronization symbol pattern may also be detrimental to high transaction volume applications.

SUMMARY OF THE INVENTION

The present invention constitutes key elements of a communication system wherein a transmitter transmits a signal and a receiver receives the transmitted signal. One aspect of the present invention is the transmission and reliable receiver detection of the preamble/synchronization portion of a transmit packet. This invention provides reliable synchronization detection in low signal to noise ratio and/or multi-path environments.

Although the correlation and synchronization techniques of the present invention could be applied to other modulation paradigms, a spread spectrum communication system is assumed for the following discussion.

Another aspect goal of the present invention is to provide correlation results and thereby synchronization detection over a transmit packet preamble/synchronization pattern that is much longer than that which can be handled by a surface acoustic wave (SAW) device. Correlation over a longer synchronization pattern has the advantage of providing enhanced signal to noise ratio results for more reliable synchronization detection in high noise environments. Correlation over a long synchronization pattern also has the advantage of making the first arrival signal pulse easier to identify in a multi-path environment.

An additional aspect of the present invention is to reduce the amount of correlation hardware required for a long synchronization pattern. For a synchronization pattern of length M×N chips, a single level correlator requires M×N correlator elements, while a two level correlation system requires either M+N or 2M+N correlator elements (depending upon system requirements).

A further aspect of the present invention is to minimize the results of thermal effects and manufacturing tolerances commonly associated with SAW devices. SAW devices (or other analog correlation devices) are used only in the receiver; the transmitter synchronization encoder digitally synthesizes the transmit synchronization pattern for all levels of encoding, using a precise frequency reference.

The down converted receive signal is applied to the first level of correlation. Although the first level correlation of the received signal could be handled by two digital correlation systems (as described below for second level correlation), given the current state of the art it is probably more economical to use analog correlation devices. This choice naturally depends upon many factors relative to the desired application; however, for the purposes of this discussion, the choice of two analog correlators or SAW devices and their associated electronics is assumed for first level correlation.

SAW devices are designed with the first level expected code sequences built into their input or output interdigital transducers. The first level code sequence built into the SAW device is defined in terms of chips. Each chip represents a binary digit (or bit) of the code sequence; the first level code sequence is known as a symbol.

The results of the SAW device first level correlation are sampled and converted to binary numbers by a high speed FLASH analog to digital (A/D) converter. The sampling rate is chosen to be an integer multiple of the symbol chip rate, in order to simplify clock generation and provide sufficient data for precise pulse arrival time calculations. This digitized first level correlation result then becomes the second level digital correlation input sample data.

Figure 1:
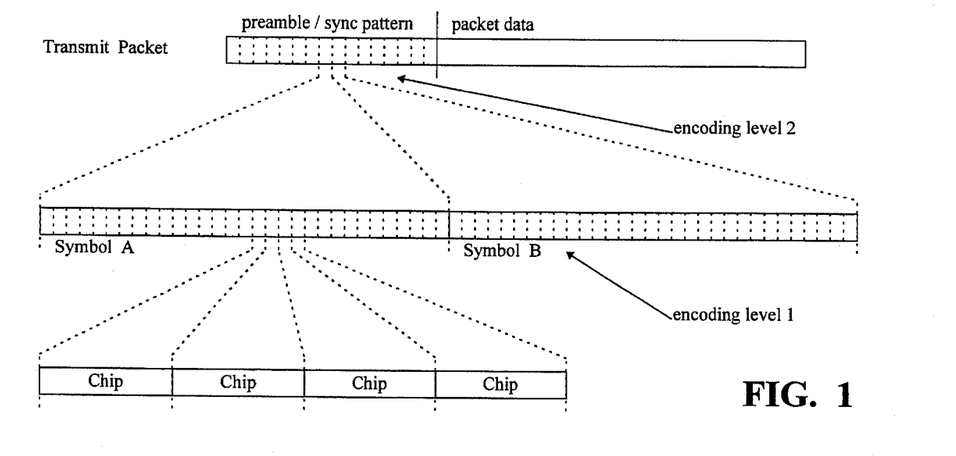
FIG. 1 illustrates the two level structure of the synchronization pattern of a transmit packet. Receiver synchronization detect correlations are performed at both the symbol level and at the synchronization pattern level.

Since the second level code defines the synchronization pattern in terms of the base level symbols, each bit of the second level encoding sequence corresponds to a base level symbol period, as shown in FIG. 1. The base level symbol rate therefore equals the second level encoding bit sequence rate.

Given a correlation code sequence of N bits, a digital correlation system is constructed of N correlator elements. The input to the correlation system is sampled and digitized at a rate much greater than the correlation code sequence bit rate i.e., greater than the lowest level chip rate. If M equals the number of samples per chip times the number of chips per symbol i.e., the number of samples per symbol, then M also represents the number of samples for each correlation code sequence bit period, or correlation code bit window. The input sample rate is then M times the correlation code sequence bit rate. Each correlation element processes M×N input samples and produces M correlated output datum during its correlation output period.

Although all correlator elements are concurrently processing the same digitized, sampled input signal (or the previous/lower level correlation results), for any given input sample, each correlator element is processing the input relative to a different bit of the known/expected correlation code sequence. As each correlator element, in turn, processes input samples relative to its last correlation code sequence bit, the corresponding correlation results are placed on the correlator system output bus. After processing the last input sample for the last correlation code sequence bit, the correlator element re-initializes and begins processing input samples corresponding to the first correlation code sequence bit; each correlator element, in turn, repeats its correlation processing.

Each correlator element input sample is multiplied by either +1 or −1 according to the value of the correlator element's current correlation code sequence bit. After all correlation code sequence bits have been processed, each correlator element output datum is the stacked, or accumulated result of N input samples as modified by their corresponding code sequence bits, where each input sample is separated by M sample intervals and has the same sample displacement from the beginning of its corresponding correlation code bit window.

Figure 2:
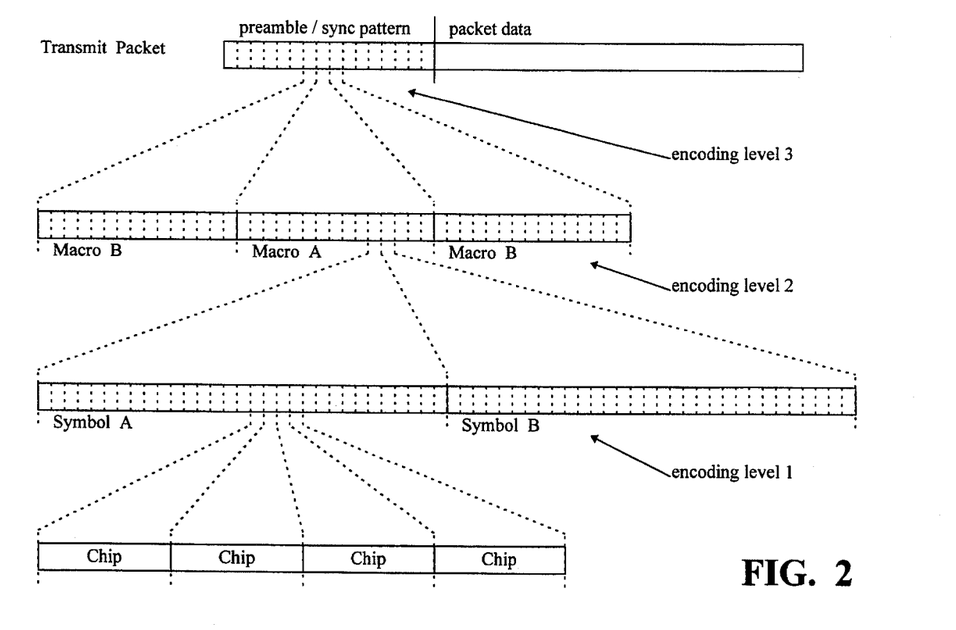
FIG. 2 illustrates a three level transmit packet synchronization pattern structure. Receiver synchronization detect correlations are performed at the symbol, macro and synchronization pattern levels.

For a very long synchronization pattern, the second level correlation result defines a macro of length M×N samples. As shown in FIG. 2, a third level sequence would then define the synchronization pattern in terms of macros, such that each bit of the third level encoding sequence corresponds to a second level macro. This multi-level correlation approach would therefore minimize the required hardware for very long synchronization patterns.

Input signal average power and correlator output average noise are calculated to reflect power and noise values for the current synchronization pattern period. Synchronization detection is then defined by the top level correlation output crossing a specified threshold above the noise level. At that instant the received signal is coherent with the expected synchronization pattern.

Synchronization detect is used to trigger post processing of the correlation output, in order to improve arrival time, or ranging calculations.

When synchronization symbols are also used for data symbols, the synchronization symbol periods may be artificially extended by a number of chip periods. This extension eliminates the possibility of data bit sequences being coherently correlated as a synchronization pattern. The required synchronization symbol period extension depends on the coherent peak spreading, due to modulation technique and the analog correlation device characteristics, and on the auto and cross-correlation characteristics of the synchronization symbol codes and extension chips chosen.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIGS. 11 and 12 are correlator element timing diagrams in which

DESCRIPTION OF THE PREFERRED EMBODIMENTS

The present invention consists of key components of a spread spectrum communication system. Specifically, a first implementation of the present invention consists of a two level synchronization pattern generator in the transmitter (FIG. 3) and a two level synchronization detector in the receiver (FIG. 4).

Although binary phase shift keyed (BPSK) modulation may be assumed for the following discussion, the RF carrier modulation technique is only incidental to this invention. Additionally, the rate ½ data modulation technique described for packet data transmission is also incidental to this invention.

Additional requirements for the first embodiment of the present invention include providing a small number of distinct synchronization signatures and using the same symbols for both synchronization pattern and data.

Figure 3:
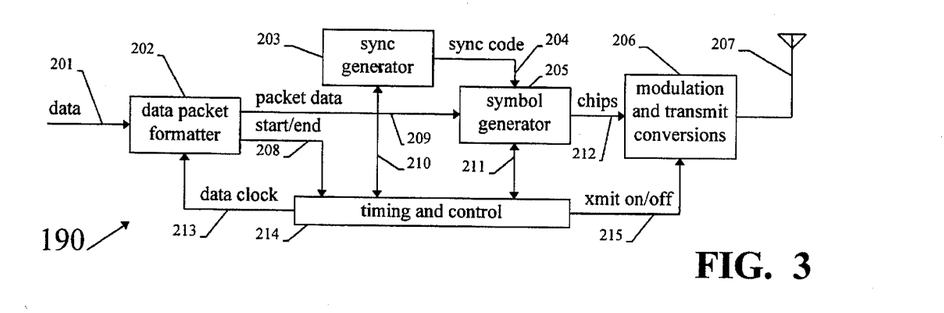
FIG. 3 is a block diagram of a two level synchronization, rate ½ spread spectrum transmitter of the present invention.
Figure 4:
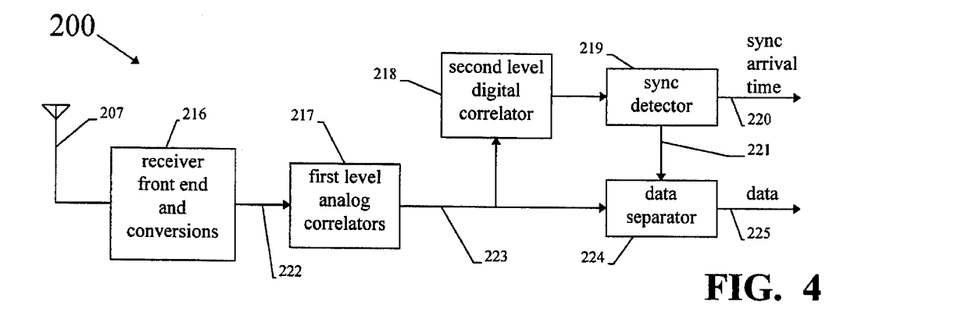
FIG. 4 is a block diagram of a two level synchronization, spread spectrum receiver.

Referring to FIG. 3, a transmitter synchronization pattern generator 190 consists of a top level synchronization code generator 203 (and state machine) which controls a bottom level symbol code generator 205. Two synchronization symbols (A and B) are used to represent the two states for each binary digit in the synchronization pattern. The synchronization pattern is therefore a binary sequence of A and B symbols. After the synchronization pattern has been transmitted, the symbol code generator 205 then uses transmit packet data 209 to generate output symbols. Output symbol chips 212 from the symbol code generator 205 modulate the transmit carrier in modulator 206.

As digital data 201 enters the transmitter, the data packet formatter 202, using conventional techniques, formats the data into a packet, and issues a start signal 208 to timing and control logic 214. The timing and control logic 214 issues transmitter power on line 215, issues a synchronization mode signal 211 to the symbol generator 205, and issues a start synchronization signal 210 to the synchronization generator 203. The synchronization generator 203 issues the synchronization pattern sequence of synchronization code parameters 204 (including symbol, symbol length and extension chips) to the symbol generator 205. For each synchronization symbol, the symbol generator 205 outputs the corresponding symbol chip sequence plus extension chips 212. When the synchronization generator 203 returns synchronization pattern complete 210, timing and control 214 rescinds synchronization mode 211 and begins issuing data clock 213 to clock packet data 209 out of the data packet formatter 202. The symbol generator 205 sends the generated symbol chips 212 to the modulation and transmit conversion 206; resulting in the desired spread spectrum transmission from the antenna 207. At the end of packet data, the formatter 202 issues packet end 208 causing timing and control 214 to turn off transmitter power 215 and cease data clock 213.

The synchronization generator 203 and the symbol generator 205 both use conventional digital techniques (e.g. PN sequence generator, Gold code generator or direct sequence shift register) to produce the desired output sequence at both generator levels. However, the transmitter synchronization code generator 203 creates different synchronization signatures by specifying a different number of extension chips, and the symbol generator 205 inserts the specified extension chips between synchronization symbols for each distinct signature. If required, additional synchronization signatures may be provided by using additional paired symbol codes in combinations with extension chip ranges.

FIG. 4 shows the relationship of the present invention's receiver synchronization detection circuitry with respect to a receiver 200. The receiver front end electronics and down conversions 216, and data separator 224 use conventional techniques for the desired form of modulation. The analog correlators 217, digital correlator 218 and synchronization detector 219 comprise the two level symbol correlation and synchronization detection system which is expanded in subsequent figures and discussed below.

Figure 5:
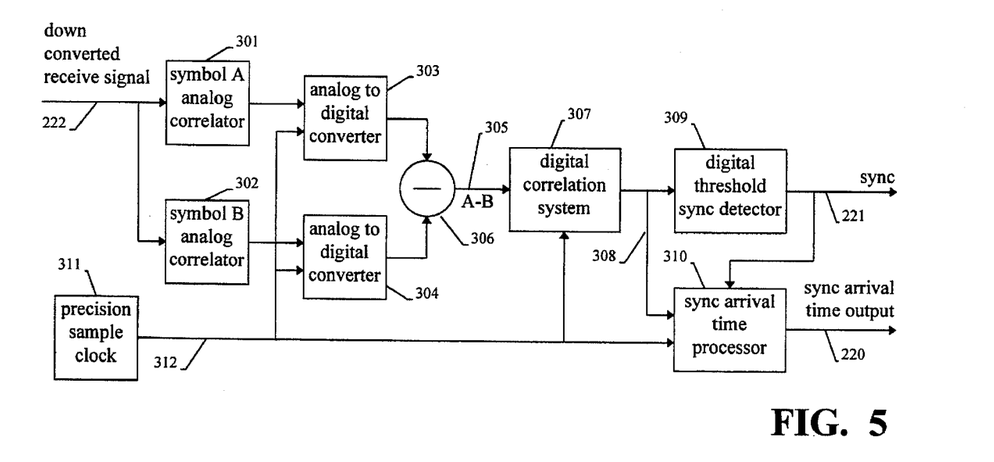
FIG. 5 is a block diagram of the receiver synchronization detector incorporating the two level differential symbol correlation system of the present invention.

The receiver synchronization correlation and detection system, FIG. 5, contains two levels of correlation. The first correlation level employs two analog correlators 301 and 302, with output A/D converters 303 and 304 in a differential symbol A minus symbol B (A–B) 306 arrangement. The sampled and digitized A–B result 305 of the first level correlation is the input to one or more second level digital correlation systems 307. Each second level correlation system 307 is initialized for both the expected synchronization pattern and number of extension chips corresponding to each expected synchronization signature.

A precision sample clock 311 generates the sampling clock input 312 to the A/D converters 303 and 304 at an integer multiple of the symbol chip rate. The top level correlation code bit window therefore spans the number of samples per chip times the number of chips per symbol (including symbol extension chips).

Figure 8:
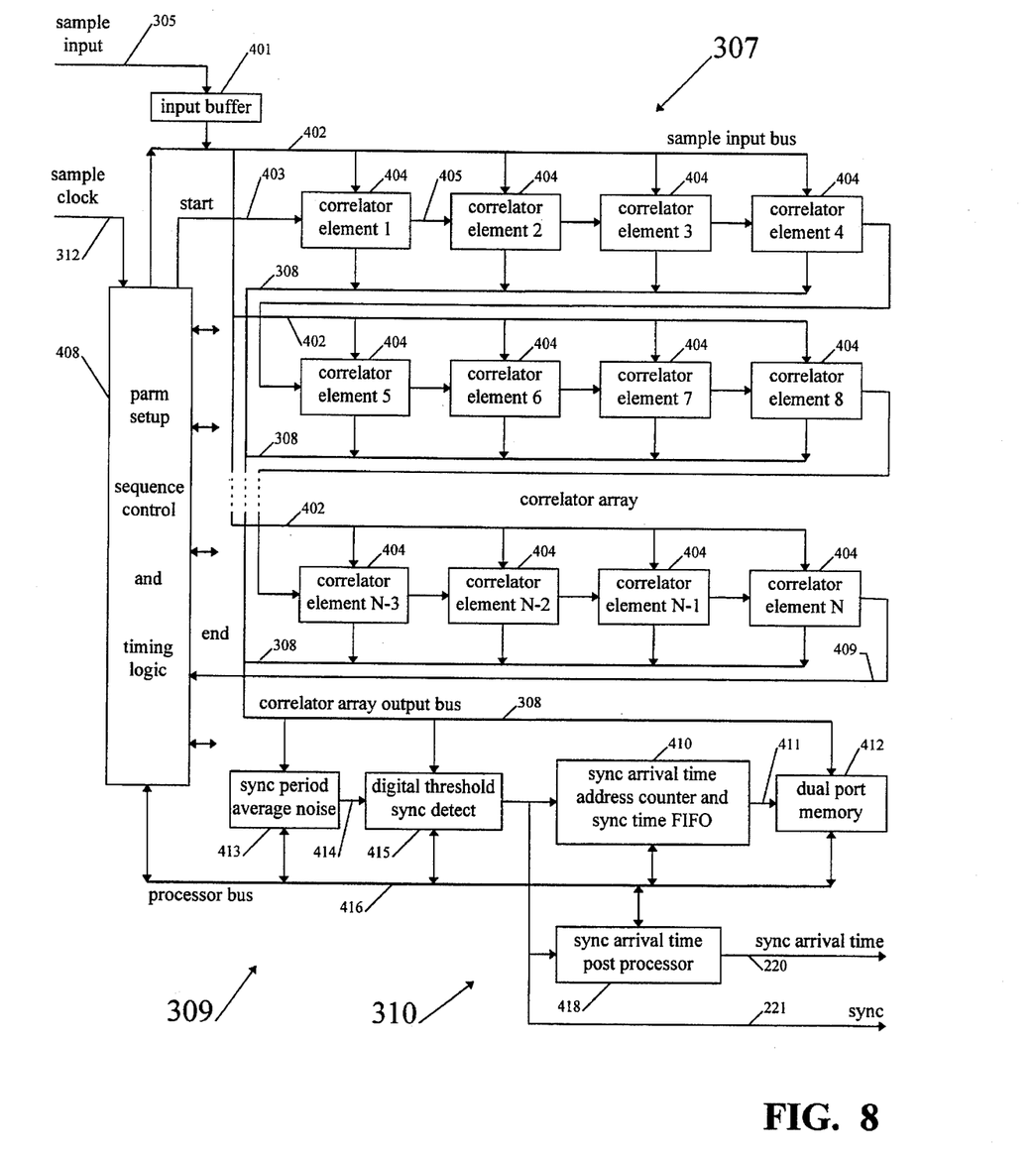
FIG. 8 is a block diagram of a digital correlation system including a digital threshold synchronization detector and synchronization arrival time post processor, and represents the top correlation level in the present invention.

The digital correlation system 307, digital threshold synchronization detector 309 and synchronization arrival time processor 310 are further expanded in FIG. 8.

Figure 6:
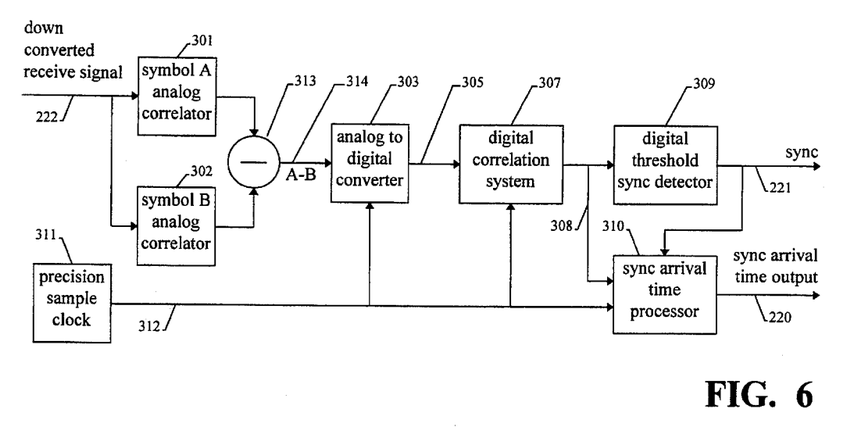
FIG. 6 is an alternate embodiment of the detector of FIG. 5, wherein the symbol difference operation is performed by analog instead of digital hardware.
Figure 7:
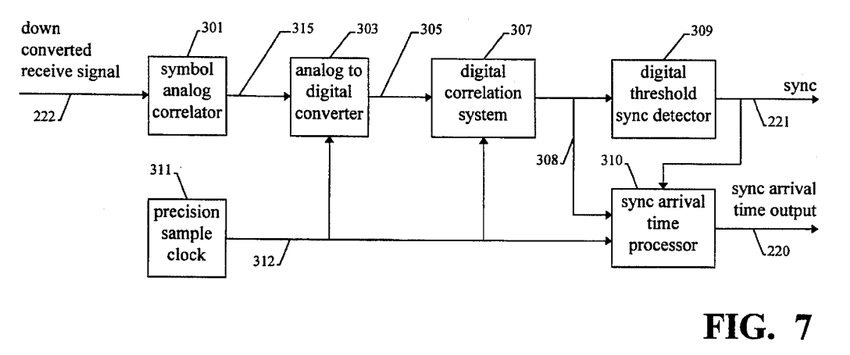
FIG. 7 is a block diagram of a receiver synchronization detector incorporating a two level correlation system of the present invention.

FIGS. 6 and 7 present alternate forms of the two level correlation system of FIG. 5. In FIG. 6, the analog difference of symbol A minus symbol B 314 is formed by 313 before the analog to digital converter 303. The result is a cost reduced system with 1 bit less digital resolution than the system of FIG. 5 given that the same type of A/D converter is used.

FIG. 7 presents the receiver correlation circuitry wherein a single symbol is either generated or not generated, corresponding to the value of each synchronization pattern sequence bit. When the symbol is not generated, the synchronization symbol period is filled with benign extension chips. Although not as robust as the method of FIG. 5, the hardware is less expensive.

An alternate scenario for the circuit of FIG. 7 provides a more robust synchronization detection, but doubles the synchronization period. The synchronization symbol period is doubled by adding benign extension chips, equal to the number of chips in a symbol. The symbol is then generated either before or after the extension chips in the extended synchronization symbol window, depending on the corresponding value of each synchronization pattern sequence bit. The digital correlation system is programmed with a two bit sequence of 01 for each synchronization pattern bit value of 0, and programmed with a two bit sequence of 10 for each synchronization pattern bit value of 1. Although less expensive than a two symbol system, the total synchronization period is doubled.

The digital correlation system 307 (FIG. 5) is shown in detail in FIG. 8 and consists of an array of correlator elements 404. Elements 404 are serviced by a data input bus 402; output bus 308; and control and buffered sample clock signals. Also included in system 307 are correlator parameter setup, sequence control and timing logic 408; a correlator output average noise calculator 413, which feeds a programmable threshold synchronization detector 415; a precision synchronization arrival time clock/counter, synchronization arrival time FIFO, and correlator output address generator 410; a dual port, correlator output data memory system 412; and a synchronization arrival time post processor 418.

As was shown in FIG. 5, the digital correlation system 307 of FIG. 8 is fed digitized sample input 305, synchronized by the sample clock 312. The sample input 305 is buffered by the input buffer 401 and placed on the sample input bus 402 (after correlator array parameter initialization).

During the correlation system initialization period, the post processor 418 over the processor bus 416 and through the parameter setup logic 408 uses the sample input data bus 402 and control signals to load the initial code sequence generation parameters, code sequence length, and number of input samples per code bit, into each correlator element 404 of the array. The post processor 418 also loads the input sample count and correlator element count and asserts run mode in the control and timing logic 408. Control and timing logic 408 then issues a start pulse 403 to the first correlator element 404 in the array.

When a start pulse is received by a correlator element 404, correlator element 404 begins processing input data corresponding to its first correlation code sequence bit. As the first correlator element 404 completes the last input sample of its first correlation code sequence bit window, it issues the start next pulse 405 to the next correlator element in the array; each correlator element 404, in turn, starts the following element 404. Since each element 404 in the array triggers the next element at the next correlation bit window boundary, the correlation sequence is established within the array. Each correlator element 404 places its correlation results on the output bus 308 during the processing of its last correlation code sequence bit.

The start next pulse 409 from the last element 404 in the array is returned to the control and timing logic 408 to assure proper sequencing of the correlator array. The last element start next pulse 409 must coincide with the next first element start pulse 403. In addition, the sequence control and timing logic 408 also provides sample clock synchronization for correlation output 308 to synchronization period average noise 413, synchronization detect 415, synchronization arrival time counter and FIFO 410, and dual port memory 412.

Figure 9:
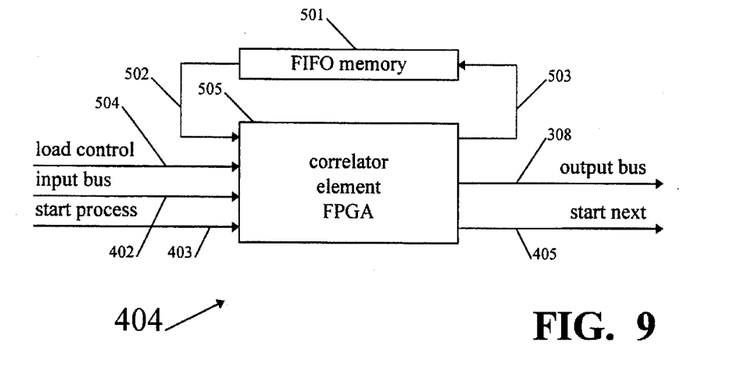
FIG. 9 is a simplified block diagram of a digital correlator element from the correlator array of FIG. 8.
Figure 10:
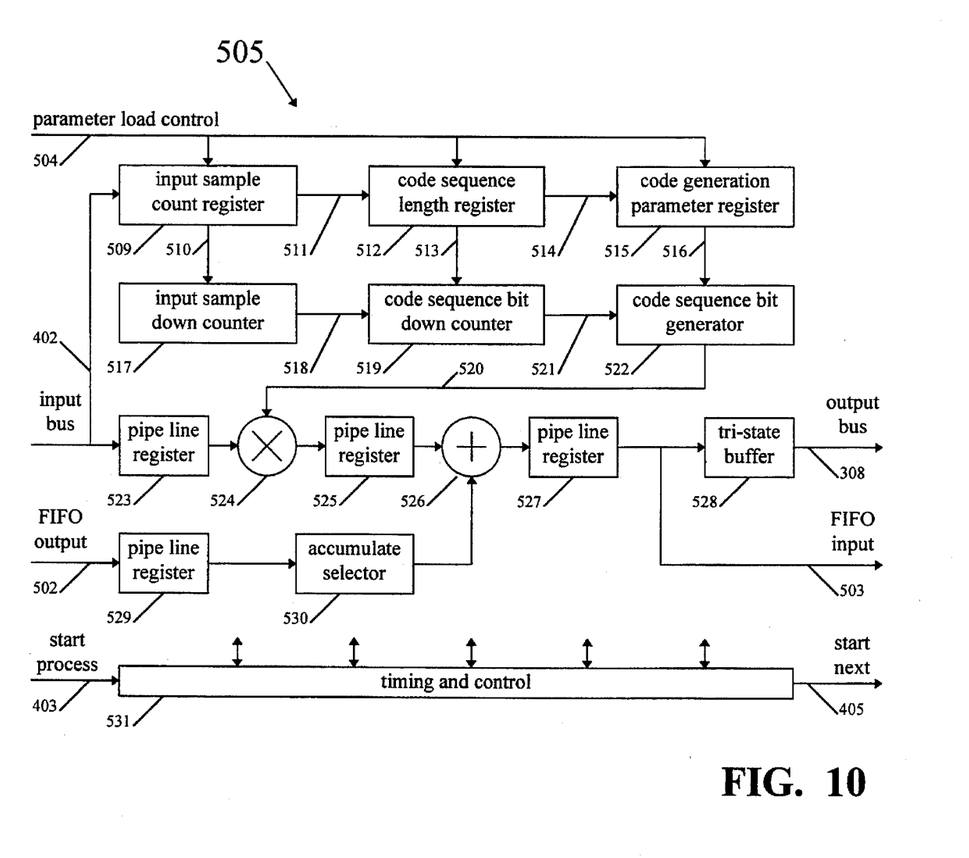
FIG. 10 is a block diagram of the internal logic in the correlator element FPGA of FIG. 9.

Referring to FIG. 9 and FIG. 10, parameter load control 504 allows parameter data to be shifted byte serially from the input bus 402, through the sample count register 509, through interconnect 511, though the code length register 512, through interconnect 514, and into the code generation parameter register 515. This is simpler than using addressable registers. Although not shown, mode control signals will provide for individual loop-back testing of each correlator element by passing a token through the array.

In operation, the start process pulse 403 causes the input sample down counter 517 to be loaded through interconnect 510, the code sequence bit down counter 519 to be loaded through interconnect 513, and the code sequence bit generator 522 to be initialized through interconnect 516. For each code sequence bit, the input sample down counter 517 simply counts the number of input samples per code bit window. When the down counter 517 reaches zero (terminal count or TC), the input sample down counter 517 is reloaded and the input counter TC pulse 518 is sent to decrement the code sequence down counter 519. The input counter TC pulse 518 is also sent to the code sequence bit generator 522 via 521, causing the next code sequence bit to be generated on 520. The code sequence bit 520 represents a +1 or −1 multiplier for the input sample data.

Input sample data from bus 402 is clocked into pipe line register 523, multiplied in 524 by the code sequence bit 520, and clocked into pipe line register 525. During the first code sequence bit window there are no previous partial correlation data in the FIFO 501 (FIG. 9); so the accumulate selector 530 passes zero to the adder 526. For the remaining windows, partial correlation data FIFO 501 output 502 is clocked into pipe line register 529, passed through selector 530, added to the modified input data in register 525, and clocked into pipe line register 527. During all code sequence bit windows but the last, the partial correlation data in register 527 is written into the FIFO 501 via 503; during the last window, the tri-state buffer 528 is enabled to output the correlation results to the correlator output bus 308.

Figure 11:
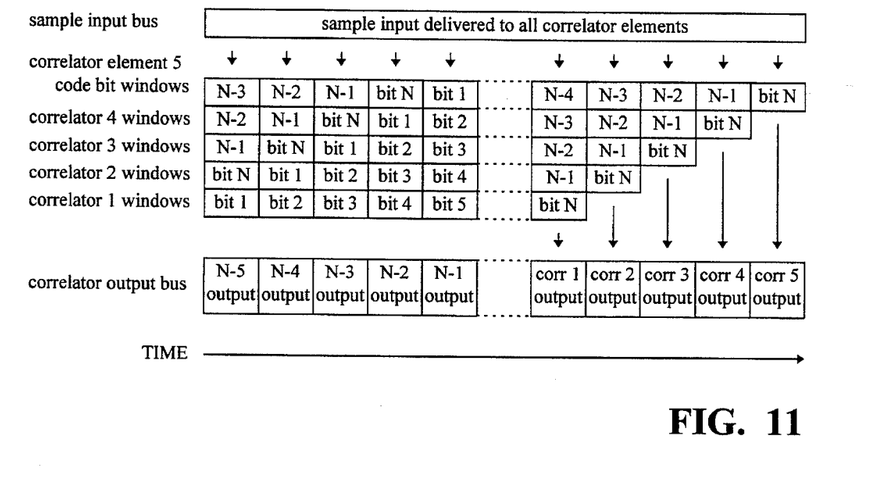
FIG. 11 shows the correlator element processing sequence, including the parallel processing offsets and sequenced output of five of the digital correlator elements of FIG. 8
Figure 12:
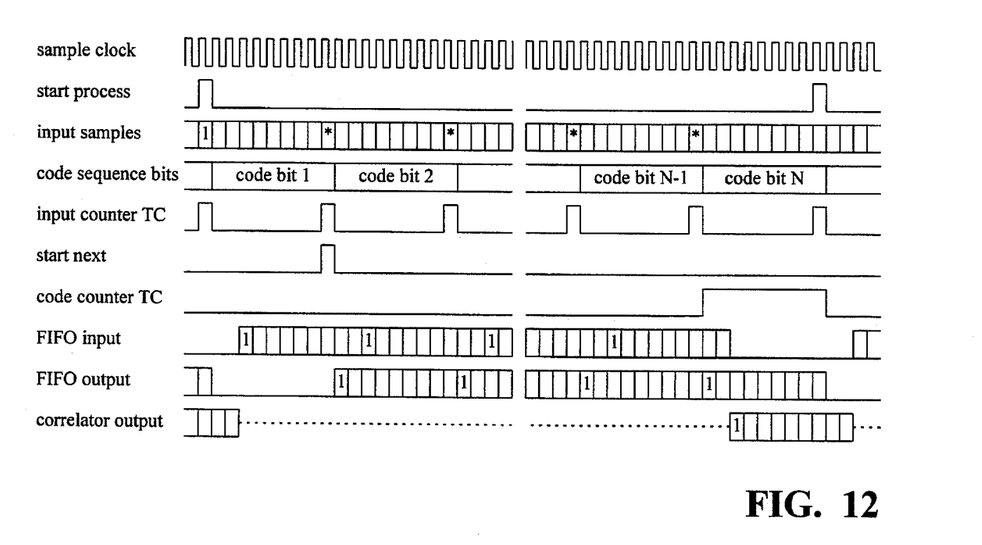
FIG. 12 is a correlator element signal timing example, using nine input samples per code bit window.

Reviewing correlator sequence and timing diagrams of FIGS. 11 and 12 should help to clarify the above discussion. FIG. 11 illustrates the sequencing of correlator elements. In the timing example of FIG. 12, the first input sample is marked "1". As this partial correlation datum circulates through the FIFO, it is stacked with modified input samples marked "*", and becomes correlator output datum marked "1".

All correlator element logic but the FIFO memory 501 is included in a programmable gate array 505 for the first rendition.

Figure 13:
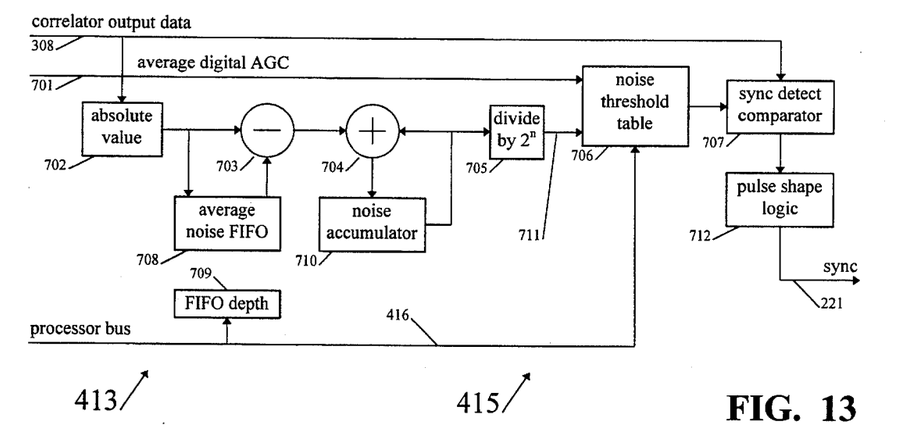
FIG. 13 is a block diagram of the digital synchronization detector.

The synchronization period average noise calculator 413 and digital threshold synchronization detector 415 of FIG. 8, are expanded in FIG. 13. The synchronization detector 415 generates a synchronization pulse 221 for the receiver's data separator 224, to latch the arrival time/address counter 722/723 and synchronization detect parameters 701 and 711 into the synchronization arrival time FIFO 410/727, and to produce a synchronization interrupt for the synchronization arrival time post processor 418.

FIG. 13 illustrates how the absolute value 702 of the correlator output data 308 is accumulated in 710, over the window of samples contained in the average noise FIFO 708. After the FIFO 708 is filled to the desired depth programmed into the FIFO depth counter 709, FIFO output elements are subtracted at 703 to maintain the correct FIFO depth and the correct total in the accumulator 710 for the synchronization period window data contained in the FIFO 708. The depth of the FIFO 708 is selected to be a power of 2, so that the average noise over the synchronization window is simply a right bit shifted output of the accumulator 710. In other words, the total noise value in the accumulator 710 is divided by the window length (of $2^n$) at 705 by performing a right shift (of n bits), to produce the average noise value.

In the presence of a strong received signal the average noise value may be quite low; however, the synchronization threshold must be relatively high, in order to avoid false synchronization detect (before the entire synchronization pattern has been received). The digitized automatic gain control from the receiver front end electronics, is used to calculate input signal strength. A sliding window integration of the digital AGC is used to find the average digital AGC 701 over the synchronization period. (Similar to the average correlator output noise calculation described above.) The average correlator noise 711 and the average digital AGC 701 values allow the synchronization detector 707 to select higher synchronization threshold values for strong received signals.

For each new correlator output datum, the average digital AGC 701 and the average noise value 711 from 705 are used to access an entry in the noise threshold table 706. The noise threshold table 706 consists of an array of precalculated threshold values stored in memory. When the synchronization detect comparator 707 finds correlator output data 308 which is greater than the accessed noise threshold table entry 706, the pulse shape logic 711 outputs the generated synchronization pulse 221.

Figure 14:
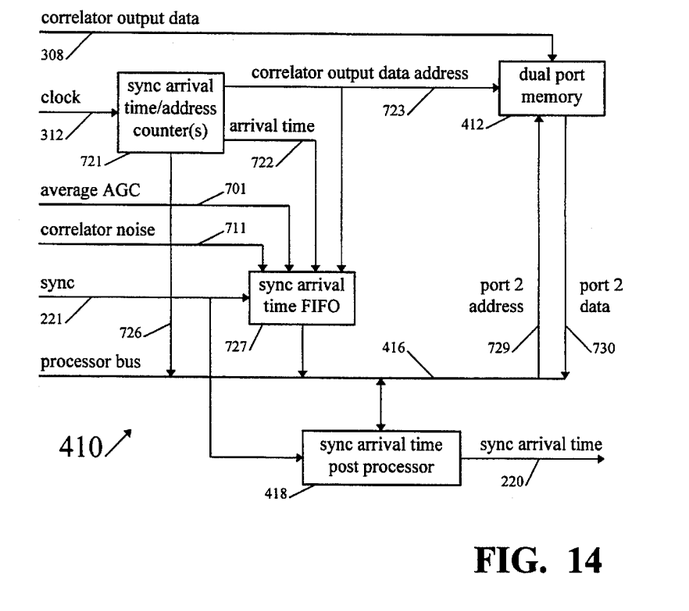
FIG. 14 is a block diagram of the synchronization arrival time logic and correlator output memory.

FIG. 14, illustrates synchronization arrival time address counter 410. The sample clock 312 is used to continuously increment the synchronization arrival time address counter 721. Correlator output datum 308 is written into dual port memory 412 at the address 723 specified by the arrival time address counter 721. Each time a synchronization pulse 221 is received, the corresponding correlator data address 723 is latched into the synchronization arrival time FIFO 727. When the post processor 418 responds to its synchronization interrupt, it reads the synchronization FIFO 727, retrieves the corresponding correlator data through memory port 2 address 729 and data 730, and calculates a precise arrival time based on the sampled correlator output data and latched synchronization FIFO 727 data.

The synchronization arrival time post processor 418 may be a DSP, RISC or microprocessor which is capable of performing the arrival time algorithm calculations in the time interval required by the specific application. The synchronization arrival time 220 is reported to a higher level processor in the receiver for synchronization signature detection and other application specific calculations.

Figure 15:
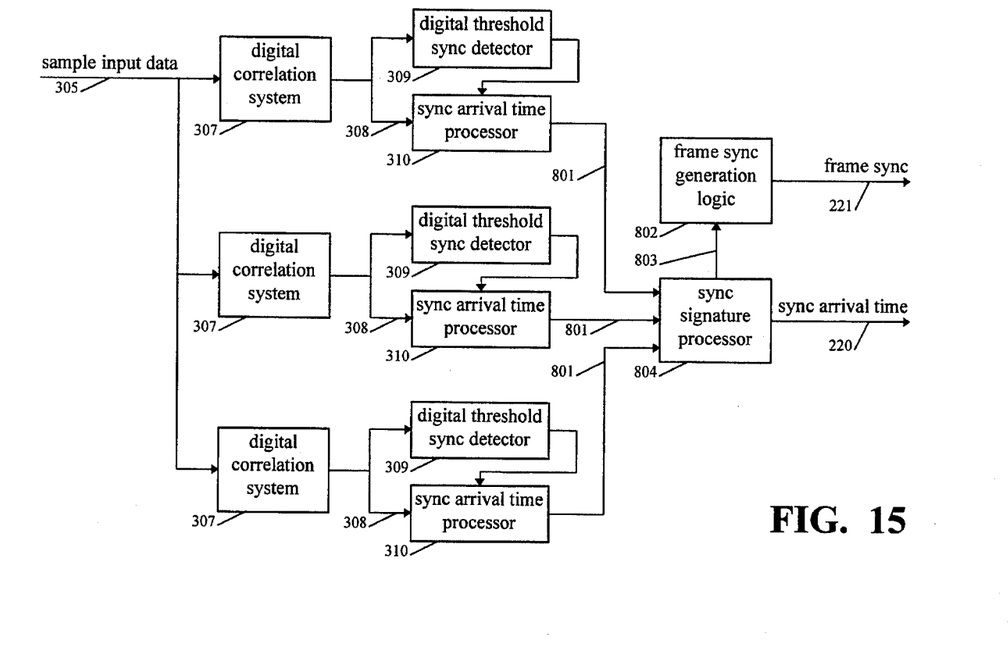
FIG. 15 is a block diagram of a top level array of three digital correlation systems, including a synchronization signature detection processor.
Figure 16A:
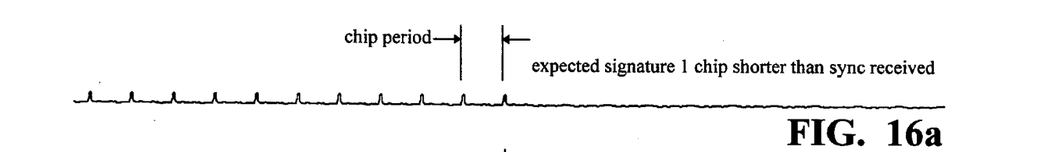
FIGS. 16a–16c illustrates the correlation output data from the three correlation systems of FIG. 15 for a specified receive synchronization pattern.
Figure 16B:
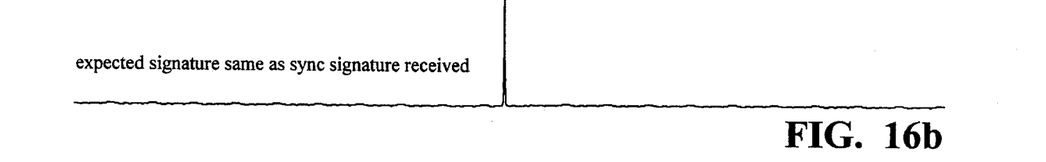
Figure 16C:
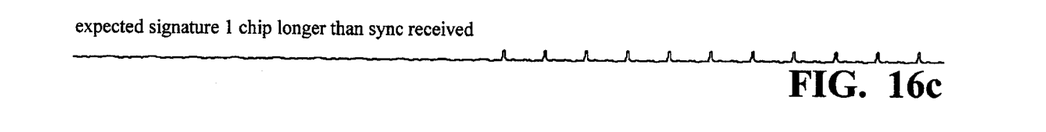

FIG. 15 contains an array of three top level digital correlators 307, where the first digital correlator is programmed for a signature with one extension chip, the second correlator is programmed for two extension chips and the third is programmed for three extension chips. For a received synchronization pattern containing two extension chips, FIG. 16a illustrates the first correlator 307 output 308; FIG. 16b illustrates the second correlator output; and FIG. 16c illustrates the third correlator output.

For synchronization signature detection, all top level synchronization arrival time processors 310 report their calculated synchronization arrival times 801 and synchronization quality factors 801 to the synchronization signature processor 804. The synchronization signature processor then windows the reported results and determines the synchronization signature received, based upon the synchronization quality factors. The signature processor reports the arrival time and signature 220 to an upper level application processor and frame synchronization logic 802 sends a frame synchronization signal 221 to the receiver's data separator circuitry 224.

The frame synchronization generation logic 802 generates a frame synchronization pulse 221 when the frame start time 803 from the signature processor 804 matches the current value 722 of the arrival time counter 721.

Figure 17:
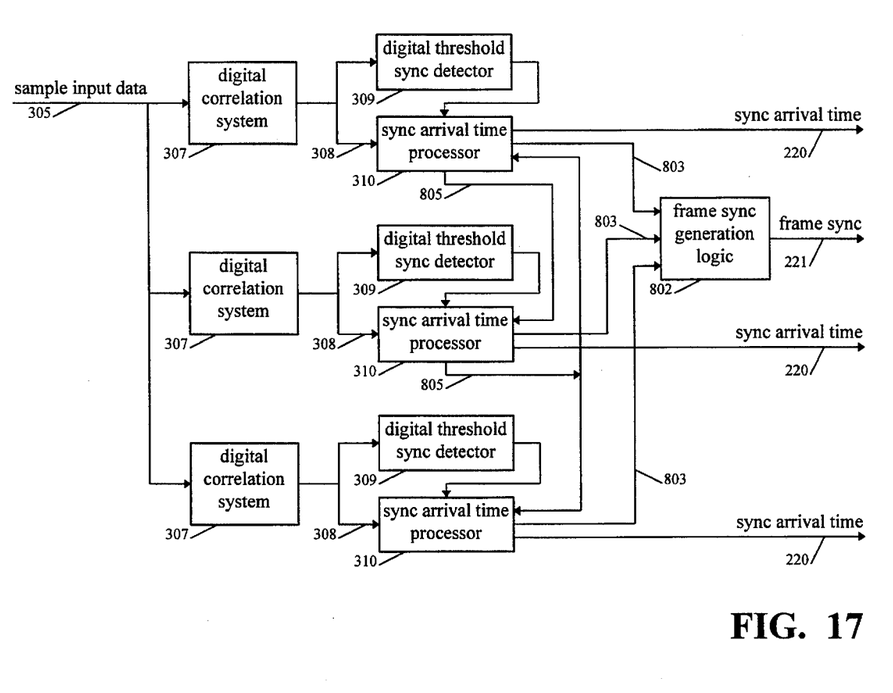
FIG. 17 is a block diagram of an alternate embodiment of the synchronization signature detector of FIG. 15.

FIG. 17 illustrates an alternate approach for synchronization signature detection, where each top level synchronization arrival time processor 310 passes its arrival time and quality factor 805 to the next top level arrival time processor 310 in the signature ordered array of correlators 307. This method eliminates the signature processor described above and distributes the signature quality comparisons between the synchronization arrival time processors 310. When one arrival time processor 310 determines that its synchronization quality is far superior to that of its predecessor, it reports the arrival time and signature 220 to an upper level application processor and frame synchronization logic 802 sends a frame synchronization signal 221 to the receiver data separator circuitry 224. Since the first arrival time processor 310 has no predecessor, it compares its result with the result of the second arrival time processor 310 in the array.

If Doppler shift were a significant factor for this first application, the number of second level correlation systems would be multiplied by the number of +/- deviation offsets desired. For large Doppler shifts, the same sampled and digitized first level output data would be sent to all second level correlation systems; however, each offset correlation system would be programmed with a slightly different number of samples per correlation code bit window. For small Doppler shifts, the first level analog would have to be re-sampled at slightly different sample rates, and then digitized and balanced for each offset correlation system. When a synchronization pulse was detected, the output of each deviation offset correlation system would be measured in order to calculate the Doppler shift. Note that there are boundaries to be avoided where Doppler shift could obscure the distinction between different synchronization signatures.

In addition, the output from a single master clock 722 (for all top level correlator systems) would be latched into the sync arrival FIFO 727 along with the local dual-port memory address counter output 723. Dividing the clock/address counter in this fashion is required in systems with multiple sample rates.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. A method for two level correlation and detection of a synchronization pattern comprising the steps of:
   a. correlating a down converted, received signal for coincidence with two expected unique symbol chip sequences, to generate two symbol correlator outputs;
   b. sampling and converting the two symbol correlator outputs into digital format;
   c. finding the binary difference of the two symbol correlator outputs and applying the differential result to inputs of top level, synchronization pattern, digital correlators;
   d. programming the top level digital correlators for an expected synchronization pattern and signature;
   e. calculating a dynamic threshold level using average received signal strength during a synchronization period and average correlator output during a specified period, as inputs for a table lookup of precalculated threshold values;
   f. detecting the arrival of the synchronization pattern when an output of the top level digital correlators exceeds the dynamic threshold level;
   g. processing outputs of the top level digital correlators to determine a precise synchronization arrival time; and
   h. comparing the output of the top level digital correlators to determine a received synchronization signature.

2. The method of claim 1, wherein the correlating step includes:
   a. finding the analog difference of the two symbol correlator outputs;
   b. sampling and converting the correlation differential outputs into digital format; and
   c. applying the sampled differential result to the inputs of top level, synchronization pattern, digital correlators.

* * * * *